A. M. ZIMMERS.
WHEEL TIRE.
APPLICATION FILED SEPT. 5, 1911.

1,103,642.

Patented July 14, 1914.

WITNESSES
Frank B. Wooden.
E. Walton Brewington.

INVENTOR
Abraham M. Zimmers,
By Henry J. Brewington,
Attorney

UNITED STATES PATENT OFFICE.

ABRAHAM M. ZIMMERS, OF BALTIMORE, MARYLAND.

WHEEL-TIRE.

1,103,642.

Specification of Letters Patent.  Patented July 14, 1914.

Application filed September 5, 1911. Serial No. 647,505.

*To all whom it may concern:*

Be it known that I, ABRAHAM M. ZIMMERS, a citizen of the United States, residing at Baltimore city, State of Maryland, have invented certain new and useful Improvements in Wheel-Tires, of which the following is a specification.

My invention relates to an improvement in vehicle tires, such as are used on automobiles and the like, and has for its object the construction of a tire in such a manner as to obtain a certain degree of resilience without danger of punctures, such as happen to pneumatic tires and render them inefficient.

With the foregoing object in view, my invention consists in certain novel features of construction and combinations of parts which will be hereinafter described and pointed out in the claim.

Reference is had to the accompanying drawings, forming a part of this specification, in which similar letters of reference are used to designate the same parts throughout the several views, in which—

Figure 1:
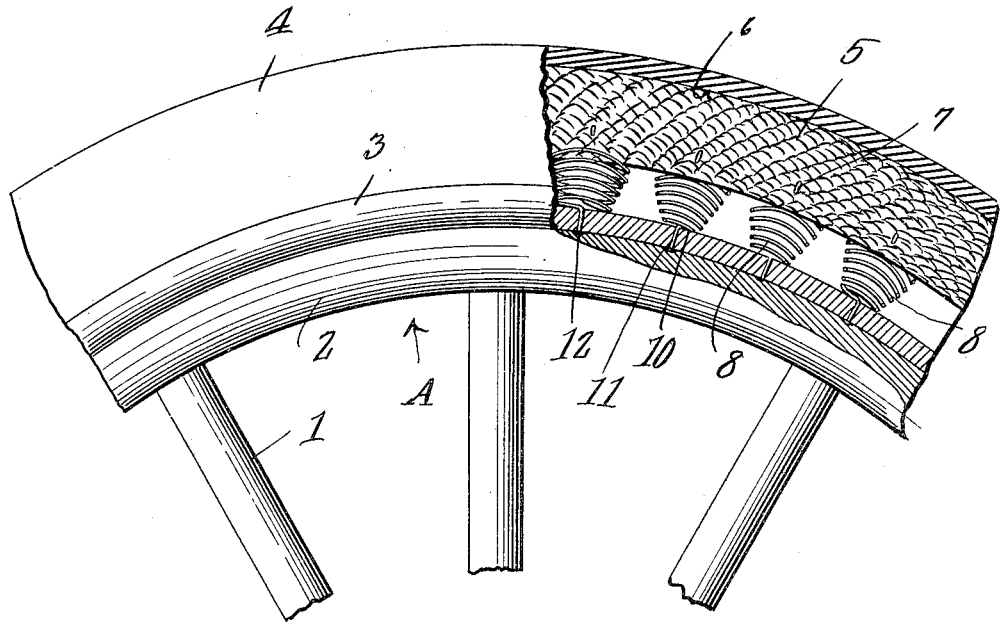
Figure 2:
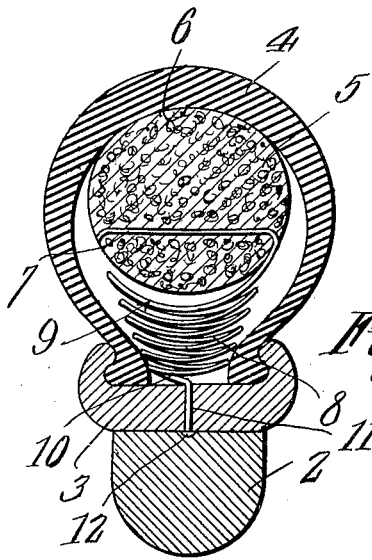
Figure 3:
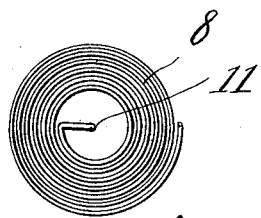

Figure 1 is a view partly in section and partly in elevation of a portion of a wheel equipped with my tire; Fig. 2 is a transverse sectional view, and Fig. 3 is a plan view of a spring used in construction of the tire.

In the drawing A indicates generally the wheel structure, composed of the spokes 1, felly 2, and rim 3, and the outer casing or tire 4. The inner tire 5, which is of smaller diameter than the interior of the outer tire or casing, is made of rope or the like and circular in cross-section or has a convex inner side and is maintained in contact with the inner surface 6 of the casing, and has secured thereto, at predetermined spaced intervals, one end 7 of a coil spring 8, the convolutions of said spring being shaped transversely of the wheel as shown at 9, to conform to the shape of the inner tire, and are gradually reduced in diameter from the end which contacts with the said tire to the end as indicated at 10, which rests on the rim as clearly shown in Fig. 3. The end 11 of each spring is secured through the rim 3 as indicated at 12.

It will be observed that I have provided a tire which is more or less resilient, cheap as to manufacture, simple in construction, and effective for the purpose intended. It will be further observed that in constructing the inner tire of rope or its equivalent and circular in cross section, and forming the springs to conform to the inner surface thereof, that under heavy loads or compression, said inner tire will be depressed and seated within the springs and adjacent to the rim and form an approximately solid bearing and sufficiently elastic to provide easy carriage. In other words, under light loads the springs do the supporting and the inner tire under heavy loads.

I am aware that slight changes and alterations might be resorted to in the form and arrangement of the several parts described, without departing from the spirit and scope of my invention, and hence I do not wish to limit myself to the exact construction as herein set forth; but, Having fully described my invention, what I claim as new and desire to secure by Letters Patent, is;

In combination, a wheel rim, an outer casing secured thereto, a continuous core circular in cross section extending around and within said casing and adapted to contact with the inner surface of the tread portion of said casing under normal loads and be seated in the opposite side of said casing under abnormal loads, and tapering coiled springs within the casing for supporting said core, the convolutions of said springs being curved to nest around the adjacent contour of said core and between said core and the walls of the casing when the core is depressed against the inner portion of the casing.

In testimony whereof I affix my signature in presence of two witnesses.

ABRAHAM M. ZIMMERS.

Witnesses:
 E. WALTON BREWINGTON,
 BROWN M. ALLEN.